(12) United States Patent
Pendleton

(10) Patent No.: US 12,540,459 B1
(45) Date of Patent: Feb. 3, 2026

(54) METHOD FOR WATER SAVING BY RETROFITTING AN INSTITUTIONAL PLUMBING FIXTURE AND PLUMBING FIXTURE MADE BY SUCH METHOD

(71) Applicant: William Pendleton, Helenville, WI (US)

(72) Inventor: William Pendleton, Helenville, WI (US)

(*) Notice: Subject to any disclaimer, the term of this patent is extended or adjusted under 35 U.S.C. 154(b) by 93 days.

(21) Appl. No.: 18/198,233

(22) Filed: May 16, 2023

Related U.S. Application Data

(63) Continuation of application No. 17/092,211, filed on Nov. 6, 2020, now Pat. No. 11,649,617.

(60) Provisional application No. 62/931,266, filed on Nov. 6, 2019.

(51) Int. Cl.
| | | |
|---|---|---|
| E03C 1/01 | (2006.01) | |
| E03C 1/122 | (2006.01) | |
| E03C 1/14 | (2006.01) | |
| E03C 1/182 | (2006.01) | |
| E03D 13/00 | (2006.01) | |

(52) U.S. Cl.
CPC .............. *E03C 1/01* (2013.01); *E03C 1/1222* (2013.01); *E03C 1/14* (2013.01); *E03C 1/182* (2013.01); *E03D 13/007* (2013.01)

(58) Field of Classification Search
CPC .......... E03C 1/1222; E03C 1/14; E03C 1/182; E03C 1/01
See application file for complete search history.

(56) References Cited

U.S. PATENT DOCUMENTS

| | | | |
|---|---|---|---|
| 2,860,348 A | 11/1958 | McClenehan | |
| 3,648,298 A | 3/1972 | Gross | |
| 3,987,502 A | 10/1976 | Hartmann | |
| 4,030,145 A | 6/1977 | Rowan | |
| 4,137,579 A * | 2/1979 | Soler | E03D 13/00 604/347 |
| 5,855,029 A | 1/1999 | Flippen | |
| 10,179,988 B2 * | 1/2019 | Lor | H04W 4/80 |
| 11,649,617 B2 * | 5/2023 | Pendleton | E03B 1/041 4/665 |
| 2011/0047694 A1 | 3/2011 | Dang | |
| 2014/0020166 A1 | 1/2014 | Metcalf | |
| 2015/0376888 A1* | 12/2015 | Chery | E03D 11/025 4/301 |
| 2016/0340882 A1 | 11/2016 | Lee | |
| 2020/0256045 A1 | 8/2020 | Trout | |

* cited by examiner

Primary Examiner — Janie M Loeppke
(74) Attorney, Agent, or Firm — Clark Hill PLC

(57) ABSTRACT

Disclosed is a method for water saving by retrofitting an institutional plumbing fixture having a combination of an integral lavatory basin and a toilet bowel integrally attached thereto by inserting into the fixture a urinal-type collection receptacle having a water inlet opening on its top side and a water outlet opening on its bottom side; and fluidly interposing the receptacle via the inlet and outlet openings between the lavatory drain pipe and the drain trap provided for the plumbing fixture. Also disclosed is an institutional plumbing fixture retrofit for water saving, and a retrofit urinal-type receptacle.

20 Claims, 8 Drawing Sheets

METHOD FOR WATER SAVING BY RETROFITTING AN INSTITUTIONAL PLUMBING FIXTURE AND PLUMBING FIXTURE MADE BY SUCH METHOD

RELATED APPLICATIONS

This is a continuation of application Ser. No. 17/092,211, filed Nov. 6, 2020, now U.S. Pat. No. 11,649,617, which claims benefit/priority of provisional patent application No. 62/931,266, filed Nov. 6, 2019, all of which are incorporated herein by reference in entirety.

BACKGROUND OF THE INVENTION

Many institutions, especially prisons, have been outfitted with individual toilet units provided in each room or cell. In most cases, these toilet units are required to be extremely resistant to vandalism and, are thus typically manufactured from strong stainless steel in an integrated form. For example, one of the most common type of such toilet units installed today comprises a stainless steel commode stand having a toilet bowl integrally connected to the commode stand, such that the unit comprises a combined toilet bowl and lavatory sink. The most common model employs a pressure flush system for the toilet bowl, in some cases providing for only a single type of flush using a single volume of water, but in other cases providing a dual flush capability, whereby a smaller volume of water can be selected by the user in the case where only urination has taken place in the toilet bowl. The lavatory sink in the pressure flush-type combined toilet-sink units drains completely separately into its own drain, separately from the toilet drain.

In these types of toilet units, a great deal of water is wasted due to the fact that, in every case of urination, a significant amount of water must be used to clear the toilet bowl, and then another amount of water must be independently used in the sink for washing of hands. The present invention provides an improvement in water saving by retro-fitting these already-installed units with a separate urinal that utilizes the hand washing water to flush the urinal, thereby obviating the need to flush the toilet altogether.

SUMMARY OF THE INVENTION

In one aspect of the invention, there has been provided an improved method for water saving by retrofitting an institutional plumbing fixture having a plurality of sidewalls, and a combination of an integral lavatory basin above the sidewalls and a toilet bowl integrally attached to one of the sidewalls below the lavatory basin, wherein the lavatory basin includes a drain pipe for draining water into a drain provided for the plumbing fixture, comprising the steps of: forming an aperture in a sidewall of the plumbing fixture; cutting out a portion of the lavatory drain pipe between the lavatory; inserting into the aperture of the sidewall a urinal receptacle having a water inlet opening on its top side and a water outlet opening on its bottom side; connecting the water inlet opening of the urinal receptacle to the lavatory drain pipe to receive water draining from the lavatory and connecting the water outlet opening of the urinal receptacle to the drain provided for the plumbing fixture, whereby water from hand washing after use of the urinal serves to flush down the urinal, without necessitating flushing of the toilet bowl, thereby saving substantial amounts of water.

In another aspect of the invention, there has been provided an institutional plumbing fixture retrofit for water saving, produced by the method described above, comprising: an institutional plumbing fixture having a plurality of sidewalls, and a combination of an integral lavatory basin above the sidewalls and a toilet bowl integrally attached to one of the sidewalls below the lavatory basin, wherein the lavatory basin includes a drain pipe for draining water into a drain provided for the plumbing fixture; and an aperture formed in a sidewall of the plumbing fixture, into which has been retrofit a urinal receptacle having a water inlet opening on its top side and a water outlet opening on its bottom side, wherein the water inlet opening of the urinal receptacle is connected to the lavatory drain pipe to receive water draining from the lavatory and the water outlet opening of the urinal receptacle is connected to the drain provided for the plumbing fixture, whereby water from hand washing after use of the urinal serves to flush down the urinal, without necessitating flushing of the toilet bowl, thereby saving substantial amounts of water.

In another aspect of the invention, there has been provided a urinal-type receptacle comprising box-shaped receptacle having a flanged opening on its front side for attachment to plumbing fixture sidewall, where the receptacle includes a water inlet opening on its top side and a water outlet opening on its bottom side, adapted to be retrofit to an existing water drain system in the plumbing fixture. This receptacle can be made of stainless steel or a plastic material.

Further objects, features and advantages of the invention will become apparent from the appended drawings and the detailed description of preferred embodiments set forth below.

DESCRIPTION OF THE DRAWING FIGURES

DETAILED DESCRIPTION OF PREFERRED EMBODIMENTS

Figure 1:
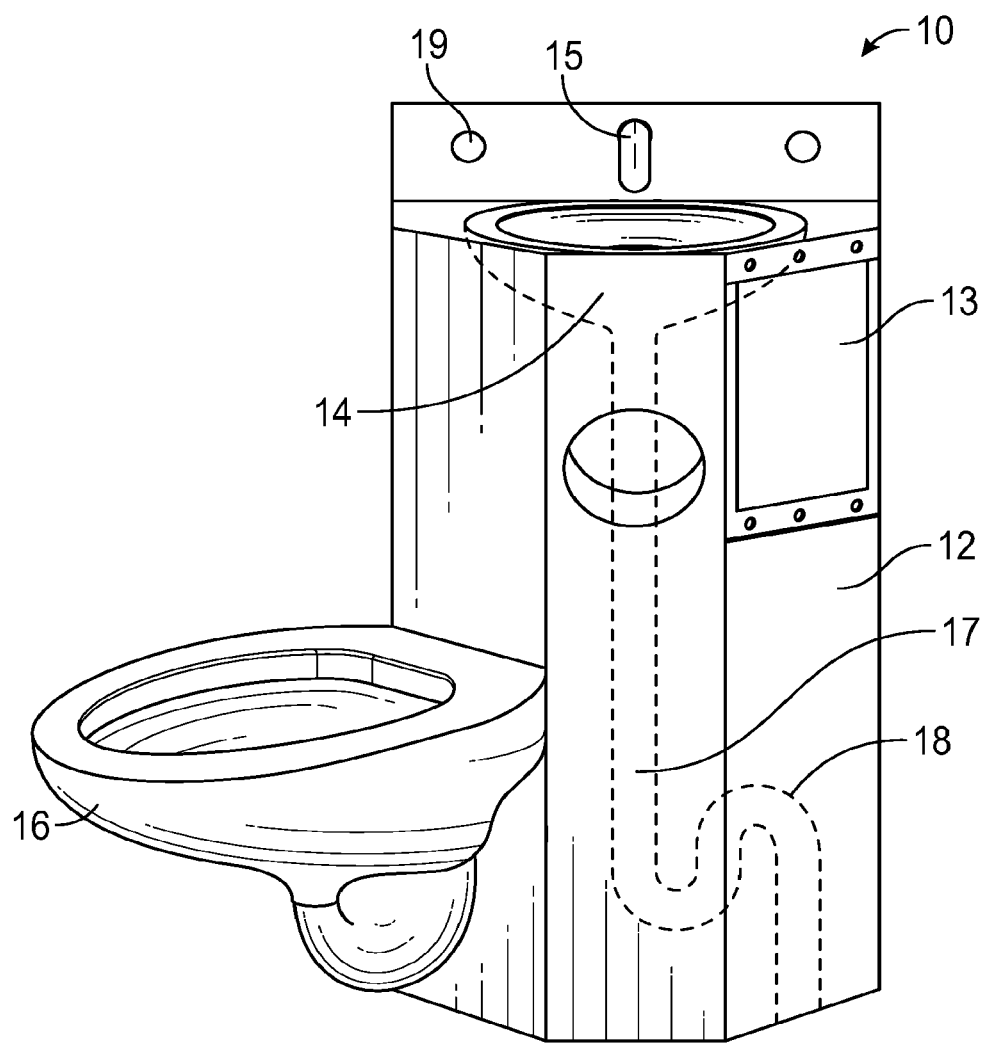
FIG. 1 is a schematic front view of a very common arrangement of a commode stand having a toilet bowl integrally connected to a commode stand.

As noted above, in the standard types of combined lavatory sink and toilet units, a great deal of water is wasted due to the fact that, in every case of urination, a significant amount of water must be used to clear the toilet bowel, and then another amount of water must be independently used in the sink for washing of hands. The present invention provides an improvement in water saving by retro-fitting these already-installed units with a separate urinal that utilizes the hand washing water to flush the urinal, thereby obviating the need to flush the toilet altogether.

Depending on the age of the unit, it could take anywhere from 3.5 to 6 gallons, of water to flush. According to the present invention for retrofitting such units to save water, the retrofit urinals would operate using less than one gallon of water, thereby providing not only environmental benefits, but also permitting institutions to cut water use cost significantly. See the tables below.

Retrofit Urinal—Water Usage Comparison

The average person urinates seven times daily, on average requiring about 5 gallons of water to flush in a standard toilet. Below are tables showing a comparison of water usage between a standard toilet module in correctional facilities versus water usage in a similar module that has been retrofit according to the present invention. It is projected that use of the retrofit urinal will result in use of les than 2 gallons of water for flushing, thereby cutting water usage significantly.

TABLE 1

One Inmate Water Usage

| Period | Retrofit Gallons Used | Standard Gallons Used |
|---|---|---|
| Year | 5,310 | 12,7775 |
| Month | 434 | 1,085 |
| Week | 98 | 245 |
| Day | 14 | 35 |

- - Retrofit Gallons Used
--- Standard Gallons Used

TABLE 2

Jefferson County, WI, Water Usage

| Period | Retrofit Gallons Used | Standard Gallons Used |
|---|---|---|
| Year | 1,170,190 | 2,925,475 |
| Month | 99,386 | 248,465 |
| Week | 22,442 | 56,105 |
| Day | 3,206 | 8,015 |

- - Retrofit Gallons Used
--- Standard Gallons Used

The following is a table showing the expected water usage comparison for all of the correctional institutions in Wisconsin, collectively. It is estimated that nearly 300 million gallons of water are wasted every year in state correctional institutions, in Wisconsin alone, just as a result of needlessly flushing of toilets. By means of the very inexpensive solution of retrofitting those toilet units according to the present invention, water usage relating to toileting activities can be reduced by about one half.

TABLE 3

Wisconsin Correctional Facilities, Water Usage

| Period | Retrofit Gallons Used | Standard Gallons Used |
|---|---|---|
| Year | 119,906,150 | 299,765,375 |
| Month | 10,183,810 | 25,459,525 |
| Week | 2,299,442 | 5,748,925 |
| Day | 328,510 | 821,275 |

- - Retrofit Gallons Used
--- Standard Gallons Used

The present invention is not limited to any particular design of an institutional combination toilet and sink unit. The benefits from the invention are achieved in any unit having a separately plumbed sink and drain system, which operates essentially independently of the combined toilet bowl and associated flushing system. Further, the invention is not limited to any particular configuration or shape of a retrofit urinal-type collection receptacle, but rather any shape can be selected that can fit within the space provided in the commode stand and still fulfill its role to serve as a urinal. Thus, many different manufacturers provide a large number of different models that can benefit from the present invention. Some are listed in the table at the end of the specification. There are hundreds of thousands of these units that are already installed in institutions, and since these types of units are designed to serve a very long lifetime, it is simply not cost-effective to replace them except when they fail.

Turning now to the drawings, FIG. 1 is a schematic front view of a very common arrangement of a commode stand 10 having a toilet bowel 16 integrally connected to a commode stand that contains a sink 14 and a faucet 15 for washing hands. The sink 14 has a separate drain pipe 17 that normally contains a drain trap 18 in the lower area of the commode stand 10. The toilet has a flush control mechanism located somewhere convenient on the commode stand, for example, flush control 19 located at the top of the rear panel of the commode stand 10. In many instances, the flush control may be located near the floor and be foot-actuated. Typically, the flush system is pressure driven, but could also be a standard tank flushing system. The fixture shown in FIG. 1 is one of the most commonly installed designs.

In the typical arrangement shown in FIG. 1, the commode stand has a shape that is defined by multiple walls 12 that are angled with respect to one another, so as to provide a beveled shape that offers flexibility in arranging the toilet bowl 16 with respect to the commode stand 10. FIG. 1 shows an opening 13 in the right side-wall 12, which is not part of the standard combined fixture, i.e., the side wall 12 is a solid or closed sheet of metal or possibly mesh. Opening 13 shows where the wall 12 may be cut out for retrofitting the urinal-type collection receptacle according to the invention. In the future, manufacturers may adopt to provide an opening, such as opening 13, that is covered by a cover that is not easily removed, so that going forward it would provide flexibility in placing the units and/or will be easier to retrofit the fixtures utilizing the concept of the invention. Not all of these combination units used in correctional institutions can benefit from the present invention, for example, those installed in female correctional institutions; however, usage of such institutions can change over time.

Figure 2:
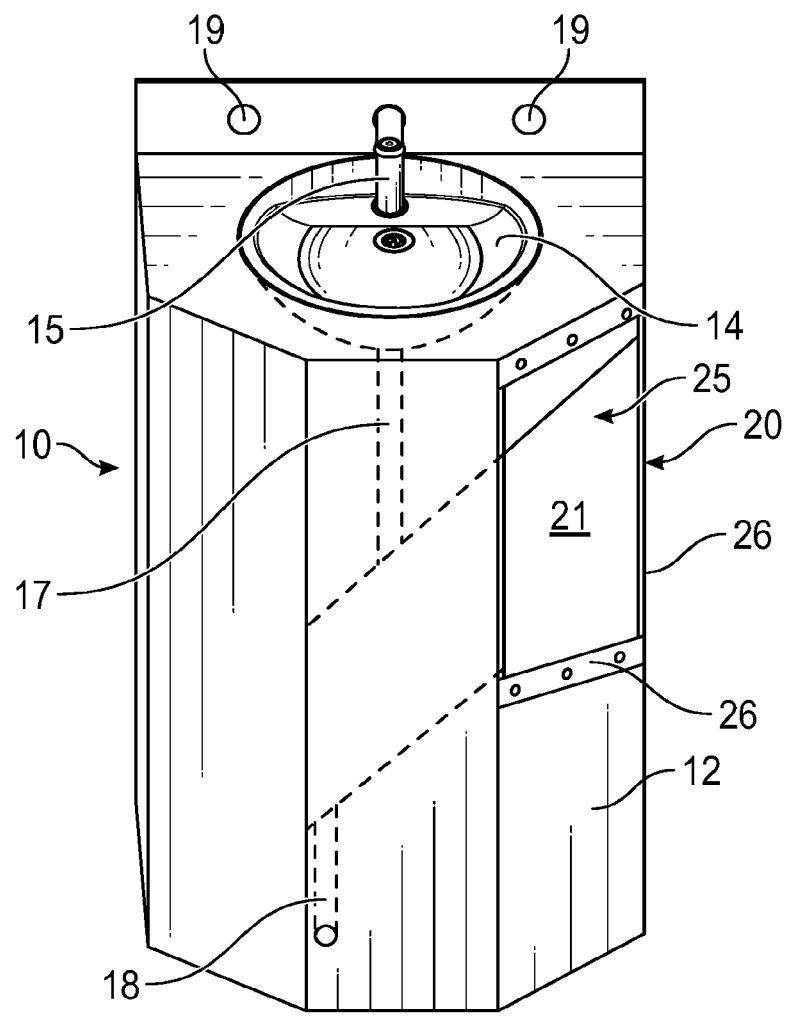
FIG. 2 is a schematic front view of only the commode stand of FIG. 1, which has been retrofitted with a urinal-type collection container according to the invention.

FIG. 2 shows only the commode stand part 20 of the fixture illustrated in FIG. 1. In FIG. 2, there is schematically illustrated how a retrofit urinal-type collection receptacle 21 can be retrofitted into the conventionally-designed commode stand, after an opening such as opening 13 in FIG. 1 is produced in the side wall 12 of the stand, in order to provide the modified commode stand 20 in FIG. 2. The urinal-type collection receptacle 21 has an opening 25 in the area where the opening is cut into wall 12. The receptacle 21 connects on the top side with the sink drain pipe 17 to provide a water supply to the receptacle during the time when a user runs water in the sink 14 to wash his hands. On the lower part of receptacle 21 is located a connection with a portion of the drain pipe associated with trap 18. The retrofit urinal-type collection receptacle 21 has a flanged frame 26 surrounding opening 25, wherein at least some of the frame parts can be provided with pre-drilled holes to connect the receptacle 21 to wall 12 of the commode stand 20.

Figure 3:
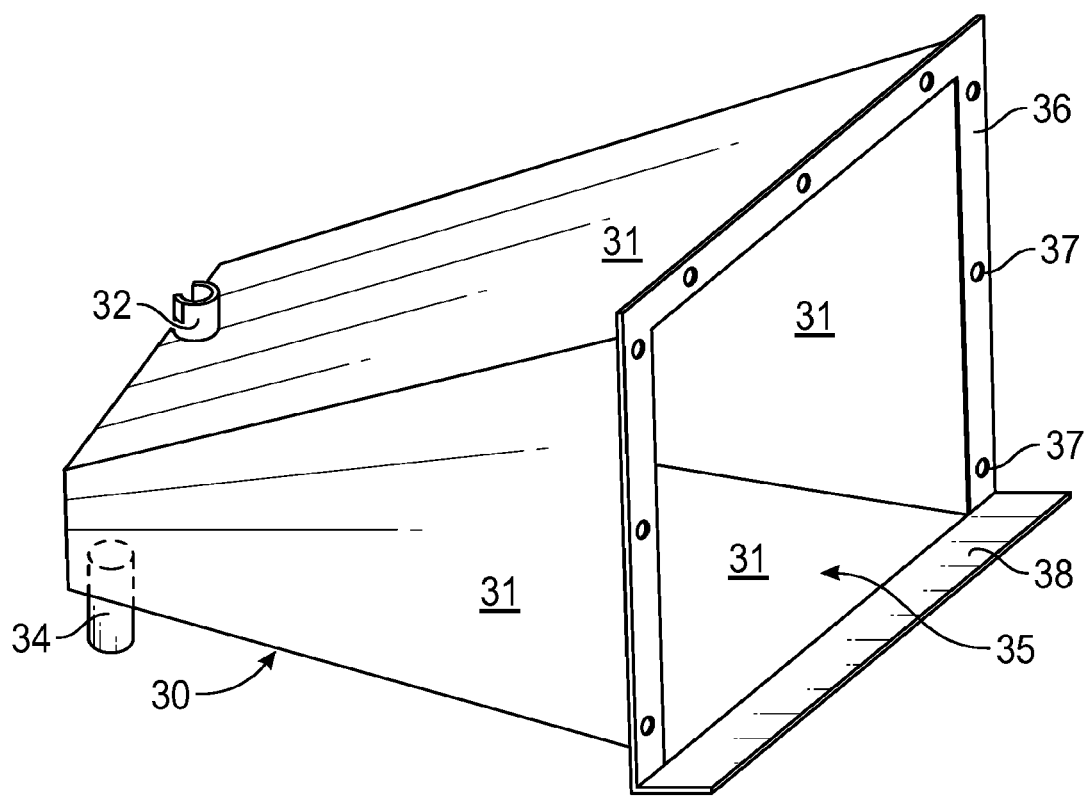
FIG. 3 is a perspective view of one preferred embodiment of a retrofit urinal-type collection receptacle according to the invention.
Figure 4:
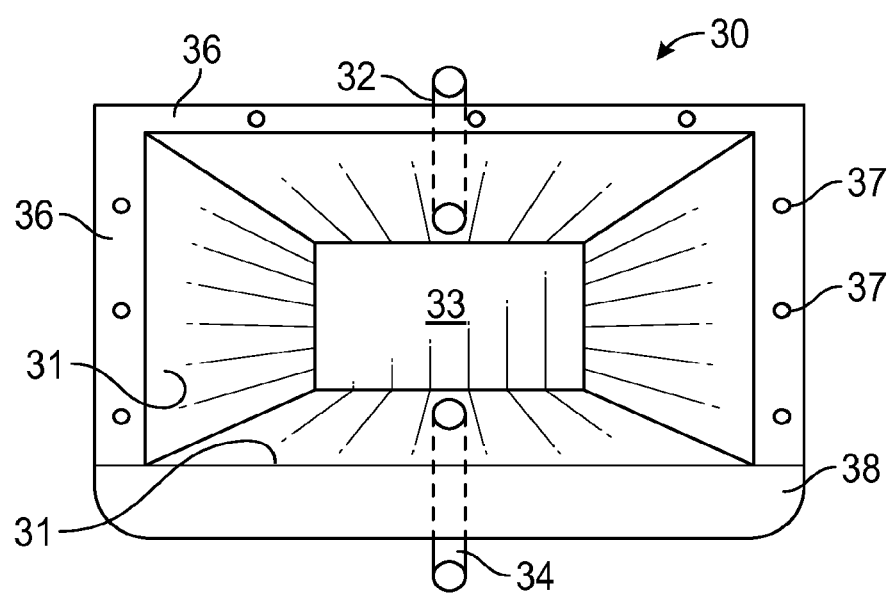
FIG. 4 is a front view taken from the opening side of the urinal-type collection receptacle in FIG. 3.

FIG. 3 is a perspective view of one preferred embodiment of a retrofit urinal-type collection receptacle 30 according to the invention. FIG. 4 is a front view, from the open side, of the receptacle shown in FIG. 3. Receptacle 31 has a configuration defined by its four side walls 31, which taper from the opening 35 down to the bottom wall 33. This shape is often convenient to accommodate placement inside of the commode stand. The top end with opening 35 is framed on three sides by flanges 36 that contain holes 37 for attaching the receptacle 30 onto a commode stand wall. At the lower edge of opening 35 is a urine drip-catching lip 38, which is not essential but is preferred. On the top side of receptacle 30 an input connecting stub 32 is attached for use in connecting the water inlet side of receptacle 30 to the drain pipe 17 (FIG. 1) from a sink, which has been severed to enable retrofitting of the receptacle 30. Similarly, the receptacle 30 also is provided on its bottom side with an outlet connecting stub 34, for connecting with the line running into a trap 18 (FIG. 1) located in a commode stand.

Figure 5:
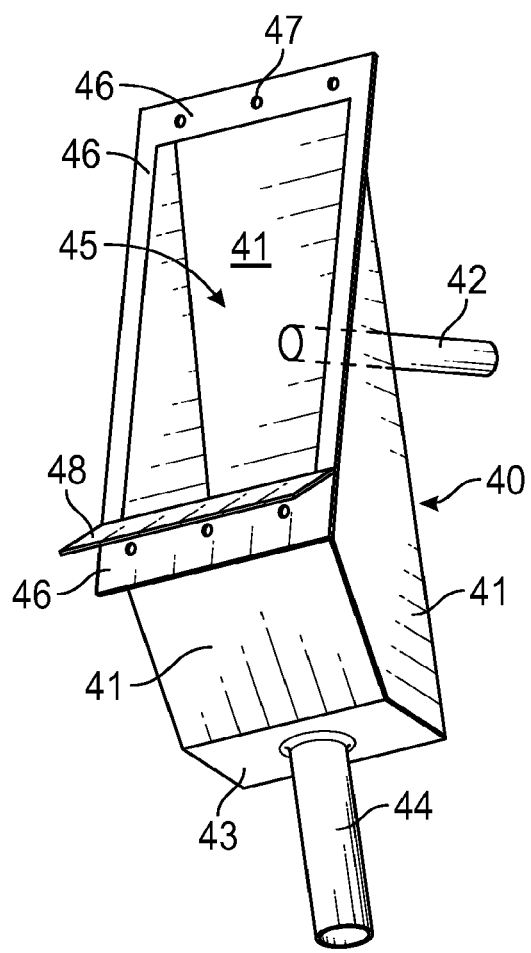
FIG. 5 is a perspective view of another preferred embodiment of a retrofit urinal-type collection receptacle according to the invention.

FIG. 5 is, a perspective view of another preferred embodiment of a retrofit urinal-type collection receptacle 40 according to the invention. Receptacle 40 has many similarities to receptacle 30 shown in FIGS. 3 and 4, but also some differences. For example, receptacle 40 has a steeper angle to the vertical when it is inserted into an opening 13 that has been cut into a vertical side wall of a commode stand, i.e., when the frame flanges 46 that surround the opening 45 are attached to a vertical side wall of a commode stand. This has the advantage of permitting insertion of receptacle 40 into a commode stand that is narrower and therefor has less interior space. Another advantage is that the water inlet connection pipe 42 can enter through the back wall 41 (the wall facing opening 45) at a higher elevation, so that the water entering from the sink drain can rinse off more of the back wall 41 as it enters the receptacle 40. In the case of receptacle 40, the outlet pipe 44 is positioned on the bottom wall 43. Drip catching lip 48 is located at the bottom of opening 45.

Figure 6:
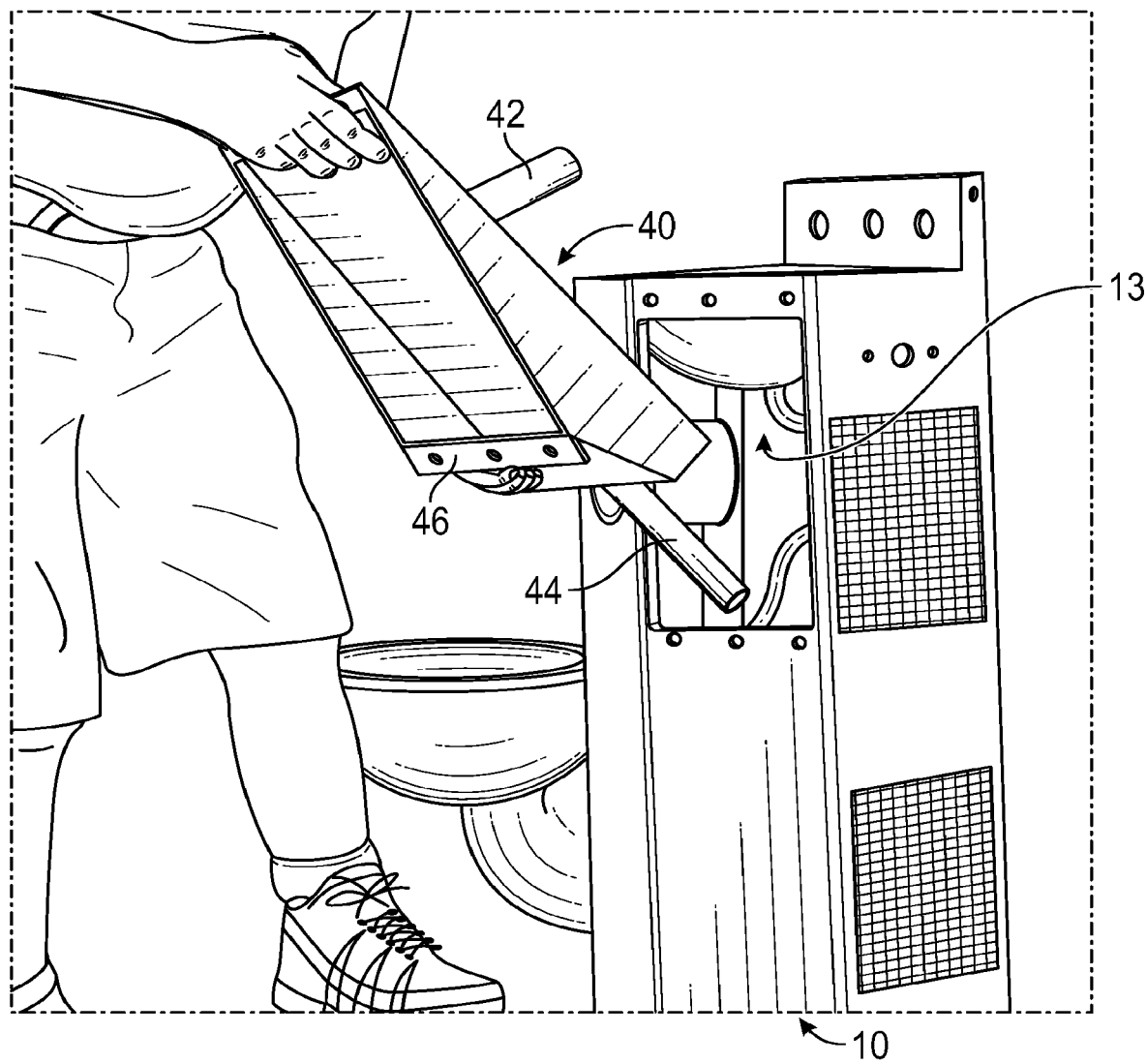
FIG. 6 is a schematic view showing the mode of inserting a retrofit urinal-type collection receptacle according to the invention into a standard commode stand that has been modified to receive the collection container.

FIG. 6 is a schematic view showing the mode of inserting a retrofit urinal-type collection receptacle 40 according to the invention into a standard commode stand 10 that has been modified to, receive the collection container by cutting an opening 13 in one of the side walls of the commode stand 10. After the opening 13 is cut out, the sink drain line 17 (FIG. 1) is severed between the sink 14 and trap 18, and then receptacle 40 is inserted into opening 13. Then the severed sink drain 17 is attached to water inlet pipe 42 and water outlet pipe 44 is attached to trap 18. Finally, receptacle 40 is securely attached to the side wall of commode stand 10, for example, by screws.

Figure 7:
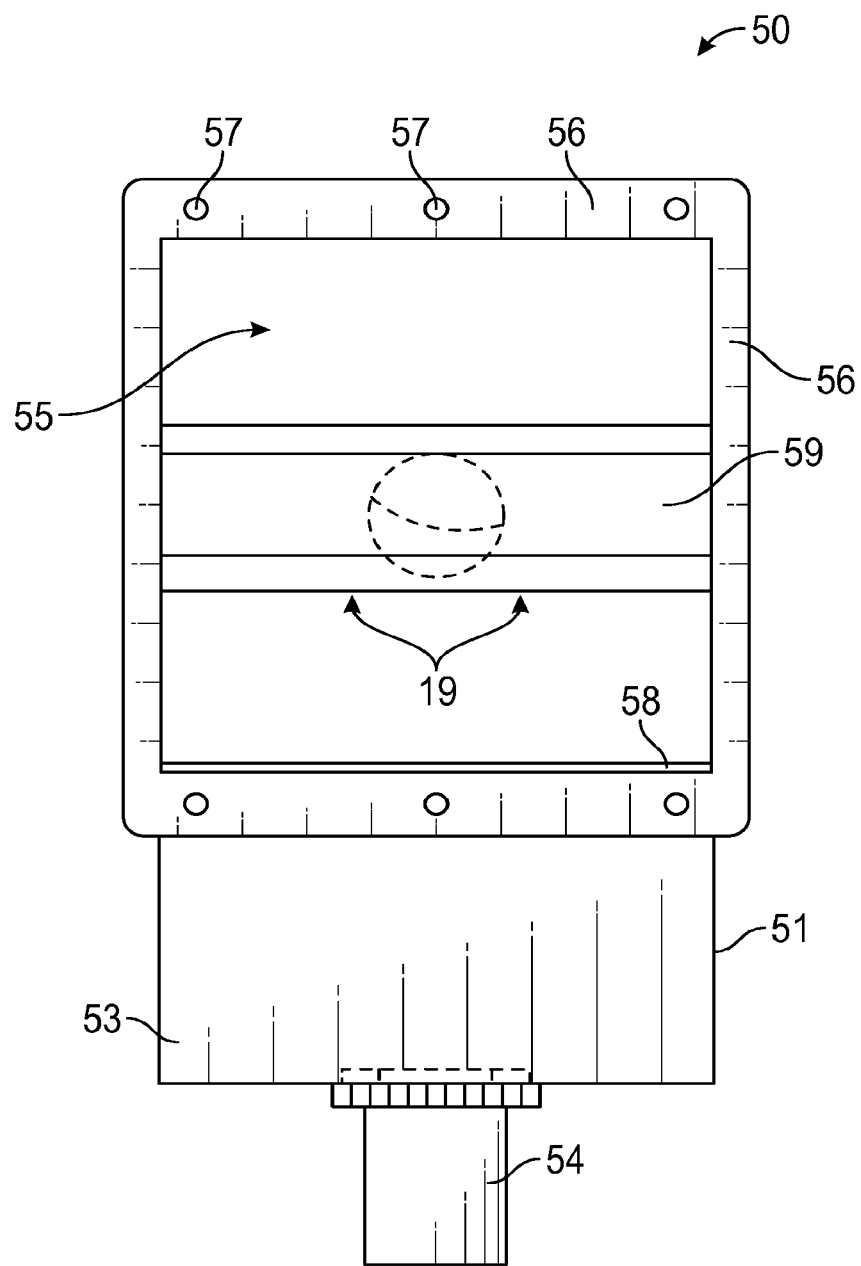
FIG. 7 is a front view another preferred embodiment of a retrofit urinal-type collection receptacle according to the invention, similar to that shown in FIG. 5, but having a water dispersing member.
Figure 8:
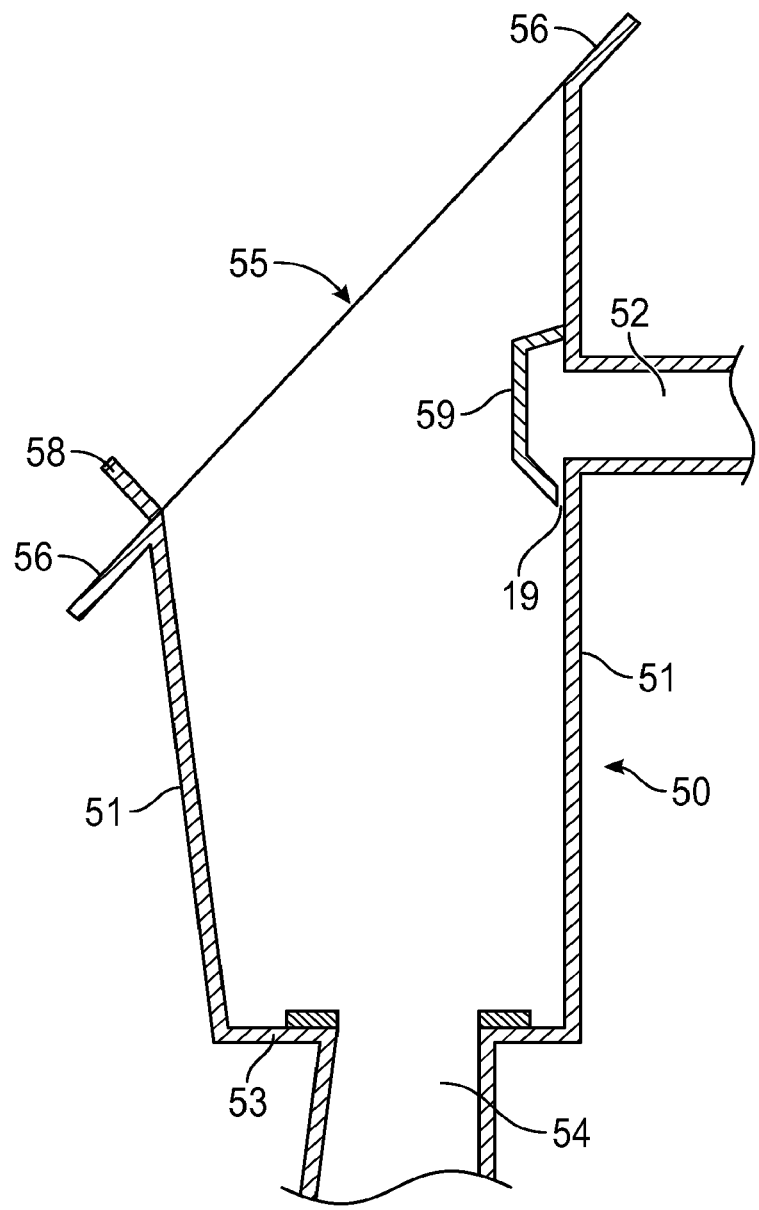
FIG. 8 is a vertical cross-sectional view taken from the right-hand side and passing through the center of the device of FIG. 7.

FIGS. 7 and 8 are a front view and a cross-sectional view, respectively, of another preferred embodiment of a retrofit urinal-type collection receptacle 50 according to the invention, similar to that shown in FIG. 5, but having in addition a water dispersing member 59 that is positioned across the width of interior back wall 51 (facing opening 55). Here again, the back wall 51 is provided with a rinse water inlet pipe 52 that is integrally connected with wall 51 of the receptacle. Water dispersing member 59 extends at least part of the distance across the inner surface of back wall 51, preferably across the entire distance, as shown in FIG. 7. Member 59 can be attached to the back wall 51 in any suitable manner, e.g., by welding along at least some points on its top edge. It functions as follows: as water enters through inlet pipe 52, it collects in the interior of water dispersing member 59 and flows away from the center where inlet pipe 52 is located, while in the meantime some of the collected water drains out of slot opening 19 and flows across the surface of back wall 51, thereby rinsing a large portion of the wall surface that is soiled during use of the urinal. As in FIG. 5, the embodiment of FIGS. 7 and 8 includes flanges 56 surrounding opening 55, a urine drip catching lip 58 and bottom wall 53 in which water outlet pipe 54 is located.

Figure 9:
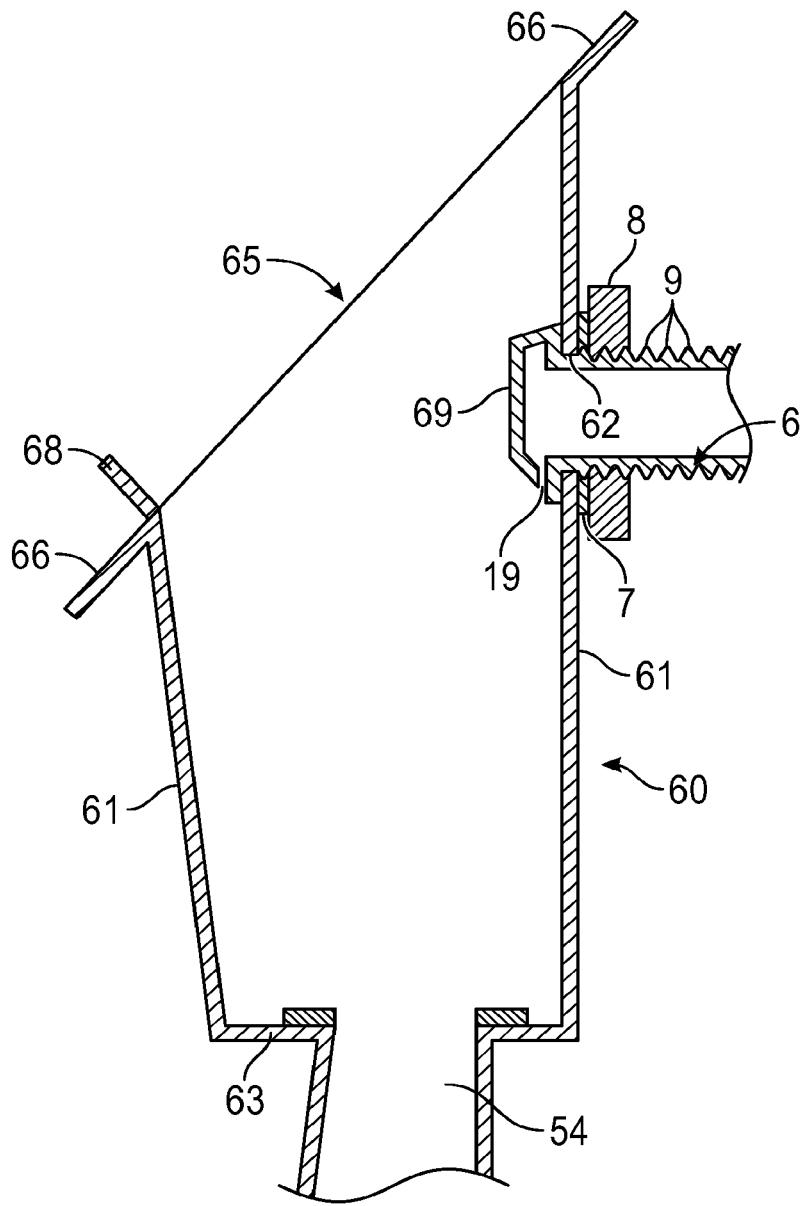
FIG. 9 is a cross-sectional view similar to FIG. 8 of a modified embodiment according to FIGS. 7 and 8, showing an alternative embodiment of the water-dispersing member.

The embodiment shown in cross-section in FIG. 9 is a view similar to FIG. 8 of a modified embodiment according to FIGS. 7 and 8, illustrating an alternative embodiment 69 of the water-dispersing member 59 in FIG. 8. The embodiment of FIG. 9, in front view, looks identical to the front view shown in FIG. 7. The only differences between the devices in FIGS. 8 and 9 can be seen in the cross-sectional view of FIG. 9. The differences involve the manner in which the water-dispersing member 69 is attached to back wall 61 of the retrofit urinal-type collection receptacle 60. The shape of the actual water-dispersing element 69 and the slot 19 are the same as in the embodiment of FIGS. 7 and 8, and the element 69 functions exactly as element 59 in FIGS. 7 and 8. However, rather than being attached by bonding directly to the surface of back wall 61, the element 69 has a water inlet stub 6 attached to it, which stub extends through an aperture 62 in back wall 61 and serves as a connection stub for connecting to the water inlet line 17 (FIG. 1) coming from the sink. In other words, the back wall 61 does not have water inlet pipe integrally connected with the back wall. The water inlet stub 6 has threads 9 on its outer surface, to cooperate with a threaded nut or ring 8, which, when tightened, seals tightly against a rubber gasket or other sealing ring 7. As in FIGS. 7 and 8, the embodiment of FIG. 9 includes flanges 66 surrounding opening 65, a urine drip catching lip 68 and bottom wall 63 in which water outlet pipe 54 is located, The invention is applicable to many other designs of plumbing units containing a combined toilet bowel and lavatory sink. A few of such designs available from Acorn Engineering are listed below:

| | |
|---|---|
| Model 1426FA | Model 1432FA |
| Front Access, 26 Inch Toilet-Lavatory Comby | Front Access, ADA Compliant, Toilet-Lavatory Comby with Angled Toilet, Angled Lavatory |
| Model LR1418 Series | Model 1418LMBFA |
| Ligature Resistant 18" Stainless Steel Lay-Toilet Comby with Oval Lavatory Bowl | Front Access, 18 Inch Comby with Toilet and Multi-Sided Lavatory Bowl |
| Model 1418FA | Model 1420FA |
| Front Access, 18 Inch Comby with Toilet and Lavatory Oval Bowl | Front Access, 20 Inch Toilet-Lavatory Comby |
| Model 1420LRB | Model 1426 |
| 20" Toilet-Lavatory Comby with Rectangular Lavatory Bowl | 26" Toilet-Lavatory Comby |
| Model 1415 | Model LR1415 Series |
| 15 Inch Comby with Toilet and Lavatory Multi-Sided Bowl | Ligature Resistant 15" Stainless Steel Lay-Toilet Comby with Round Lavatory Bowl |
| Model 1418 | Model 1418LMB |
| 18 Inch Comby with Toilet and Lavatory Oval Bowl | 18 Inch Comby with Toilet and Multi-Sided Lavatory Bowl |

What is claimed is:

1. A modular retrofit device that is inserted into an aperture cut in a sidewall of an institutional plumbing fixture, the institutional plumbing fixture having a plurality of sidewalls, a combination of an integral lavatory basin above the sidewalls, and a toilet bowl integrally attached to one of the sidewalls below the lavatory basin, wherein the lavatory basin includes a drain pipe for draining water into a drain trap provided for the plumbing fixture, the drain pipe having a portion cut out between the lavatory and the drain trap to yield an upper opening of the drain pipe and a lower opening of the drain pipe between which the modular retrofit device is inserted, the modular retrofit device comprising:

a urinal-type collection receptacle that is shaped and dimensioned to fit into the aperture cut in the sidewall of the institutional plumbing fixture to receive the modular retrofit device as an insert that is retrofit into the institutional plumbing fixture to redirect water used to wash a user's hands to flush the urinal-type collection receptacle and thereby save water;

a water inlet opening on a top side of the urinal-type collection receptacle, wherein the water inlet opening including a first connecting stub (32) that connects the water inlet opening of the urinal-type collection receptacle to the upper opening of the drain pipe such that water draining from the lavatory is received through the water inlet opening;

a water outlet opening on a bottom side of the urinal-type collection receptacle, wherein the water outlet opening includes a second connecting stub (34) that connects the water outlet opening of the urinal-type collection receptacle to the lower opening of the drain trap of the institutional plumbing fixture;

wherein, upon insertion of the modular retrofit device into the aperture of the institutional plumbing fixture, a continuous, open flow channel is established to redirect water used by the user to wash the user's hands after urinating in the plumbing fixture from the lavatory basin, down through the upper opening of the drain pipe, into the water inlet opening, then through and across an interior of the urinal-type collection receptacle, out through the water outlet opening, then down through the lower opening of the drain pipe, wherein water from hand washing after urination into the urinal-type collection receptacle serves to flush down the receptacle, without necessitating flushing of the toilet bowl, thereby saving amounts of water otherwise used in flushing of the institutional plumbing fixture.

2. The device of claim 1, wherein the water inlet opening of the urinal-type collection receptacle is connected to the lavatory drain pipe to receive water draining from the lavatory, and the water outlet opening of the urinal-type receptacle is connected to the drain trap provided for the plumbing fixture, whereby water from hand washing after use of the urinal serves to flush down the urinal-type receptacle, without necessitating flushing of the toilet bowl, thereby saving amounts of water otherwise used in flushing of the institutional plumbing fixture.

3. The device of claim 1, wherein the urinal-type collection receptacle comprises a generally closed urine collection receptacle having a flanged opening on its front side for attachment to the side wall of the plumbing fixture, wherein the inlet opening and the outlet opening are adapted to be retrofit to an existing water drain system in the plumbing fixture to thereby add the urinal-type receptacle as a urinal thereto, such that the urinal-type receptacle is used instead of the toilet bowl for urination-only bathroom visits and is washed by water from the lavatory basin via flow of the water from the water inlet opening, across an interior of the urinal-type receptacle, and out of the outlet opening, to flush urine without necessitating flushing of the toilet bowl, thereby saving amounts of water otherwise used in flushing of the institutional plumbing fixture to clean the urinal-type collection receptacle of urine.

4. The device of claim 3, wherein the receptacle is made of stainless steel or a plastic material.

5. The device of claim 3, wherein the top side of the urinal-type collection receptacle includes a downward facing inner surface, through which the water inlet opening opens, such that the water from hand washing performed in the lavatory basin exits from the water inlet opening and drains down the inner surface, thereby serving to flush down the receptacle.

6. The device of claim 5, wherein the downward facing inner surface is positioned as a back wall of the urinal-type collection receptacle and the water inlet opening is positioned at an elevation along the back wall higher than a remaining, lower half of the urinal-type collection receptacle, such that the water entering the urinal-type collection receptacle from the water inlet opening from the lavatory basin rinses off the remaining, lower half of the urinal-type collection receptacle below the water inlet opening.

7. The device of claim 6, wherein the urinal-type collection receptacle includes a drip catching lip is installed at a bottom of a main opening of the urinal-type collection receptacle, the main opening being an orifice through which urine from a user enters the urinal-type collection receptacle.

8. The retrofit urinal-type receptacle of claim 7, wherein the urinal-type collection receptacle includes a water-dispersing member positioned at the water inlet opening to disperse the water.

9. The device of claim 8, wherein the water-dispersing member has a stub that passes back through the water inlet opening to mechanically couple with the existing water drain system via a sealed fitting.

10. The device of claim 1, wherein the urinal-type collection receptacle is made of stainless steel or a plastic material.

11. The device of claim 1, wherein the water inlet opening is shaped and located in position at an elevation along the top side higher than a remaining, lower half of the urinal-type collection receptacle, such that the water entering the urinal-type collection receptacle from the water inlet opening from the lavatory basin rinses the remaining, lower half of the urinal-type collection receptacle below the water inlet opening.

12. The device of claim 1, wherein the top side of the urinal-type collection receptacle includes a downward facing inner surface, through which the water inlet opening opens, such that the water from hand washing performed in the lavatory basin exits from the water inlet opening and drains down the inner surface, thereby serving to flush down the receptacle.

13. The device of claim 12, wherein the downward facing inner surface is positioned as a back wall of the urinal-type collection receptacle and the water inlet opening is positioned at an elevation along the back wall higher than a remaining, lower half of the urinal-type collection receptacle, such that the water entering the urinal-type collection receptacle from the water inlet opening from the lavatory basin rinses off the remaining, lower half of the urinal-type collection receptacle below the water inlet opening.

14. The device of claim 1, wherein the urinal-type collection receptacle includes a drip catching lip at a bottom of a main opening of the urinal-type collection receptacle, the main opening being an orifice through which urine from a user enters the urinal-type collection receptacle.

15. The device of claim 1, wherein the urinal-type collection receptacle includes a water-dispersing member positioned at the water inlet opening to disperse the water.

16. The device of claim 15, wherein the water inlet opening is shaped and located at a position at an elevation along the top side higher than a remaining, lower half of the urinal-type collection receptacle, such that the water entering the urinal-type collection receptacle from the water inlet opening from the lavatory basin rinses the remaining, lower half of the urinal-type collection receptacle below the water inlet opening.

17. The device of claim 16, wherein the top side of the urinal-type collection receptacle includes a downward facing inner surface, through which the water inlet opening opens, such that the water from hand washing performed in the lavatory basin exits from the water inlet opening and drains down the inner surface, thereby serving to flush down the receptacle.

18. The device of claim 17, wherein the downward facing inner surface is positioned as a back wall of the urinal-type collection receptacle and the water inlet opening is positioned at an elevation along the back wall higher than a remaining, lower half of the urinal-type collection receptacle, such that the water entering the urinal-type collection receptacle from the water inlet opening from the lavatory basin rinses off the remaining, lower half of the urinal-type collection receptacle below the water inlet opening.

19. The device of claim 18, wherein the urinal-type collection receptacle includes a drip catching lip is installed at a bottom of a main opening of the urinal-type collection receptacle, the main opening being an orifice through which urine from a user enters the urinal-type collection receptacle.

20. The device of claim 19, wherein the water inlet opening is shaped and located at a position at an elevation along the top side higher than a remaining, lower half of the urinal-type collection receptacle, such that the water entering the urinal-type collection receptacle from the water inlet opening from the lavatory basin rinses the remaining, lower half of the urinal-type collection receptacle below the water inlet opening.

\* \* \* \* \*